No. 879,576. PATENTED FEB. 18, 1908.
L. M. NIELSEN.
ENVELOP SEALING AND STAMPING MACHINE.
APPLICATION FILED JULY 20, 1903.
10 SHEETS—SHEET 1.

No. 879,576. PATENTED FEB. 18, 1908.
L. M. NIELSEN.
ENVELOP SEALING AND STAMPING MACHINE.
APPLICATION FILED JULY 20, 1903.
10 SHEETS—SHEET 3.

No. 879,576. PATENTED FEB. 18, 1908.
L. M. NIELSEN.
ENVELOP SEALING AND STAMPING MACHINE.
APPLICATION FILED JULY 20, 1903.
10 SHEETS—SHEET 5.

Fig.5.

Witnesses:
Louis J. Jones
E. Q. Liset

Inventor:
Laurits M. Nielsen
By Henry J. Miller
atty.

No. 879,576. PATENTED FEB. 18, 1908.
L. M. NIELSEN.
ENVELOP SEALING AND STAMPING MACHINE.
APPLICATION FILED JULY 20, 1903.
10 SHEETS—SHEET 6.

Fig. 6.

Witnesses:

Inventor:
Lauritz M. Nielsen
By Henry J. Miller
atty.

No. 879,576. PATENTED FEB. 18, 1908.
L. M. NIELSEN.
ENVELOP SEALING AND STAMPING MACHINE.
APPLICATION FILED JULY 20, 1903.
10 SHEETS—SHEET 9.

No. 879,576. PATENTED FEB. 18, 1908.
L. M. NIELSEN.
ENVELOP SEALING AND STAMPING MACHINE.
APPLICATION FILED JULY 20, 1903.

UNITED STATES PATENT OFFICE.

LAURITS M. NIELSEN, OF MONTCLAIR, NEW JERSEY.

ENVELOP SEALING AND STAMPING MACHINE.

No. 879,576.     Specification of Letters Patent.     Patented Feb. 18, 1908.

Application filed July 20, 1903. Serial No. 166,304.

*To all whom it may concern:*

Be it known that I, LAURITS M. NIELSEN, of Montclair, in the county of Essex and State of New Jersey, have invented certain new and useful Improvements in Envelop Sealing and Stamping Machines, of which the following is a specification, reference being had therein to the accompanying drawings.

This invention has reference to improvements in machines for sealing envelops, or wrappers, and for affixing stamps to the envelops, to wrappers, cards, or similar articles.

The object of the invention is to construct a machine of this character that the sealing and stamp affixing operations shall be carried out during the progress of the envelop through the machine, the mechanism being adapted through simple adjustments to accomplish either the sealing or stamping operation singly.

Another object of the invention is to improve the water distributing system and the moistening appliances.

Another object of the invention is to improve the means for moistening and closing the flap of the envelop.

Another object of the invention is to improve the sealing and the stamping disconnecting means, whereby either of these mechanisms may be disconnected without affecting the operation of the other of the mechanisms.

Another object of the invention is to so construct the stamp strip feed that the strip of stamps may be accurately fed to the stamp affixer.

Another object of the invention is to provide a mechanical stamp affixing machine with means for receiving and safely holding a stamp, or stamps, inadvertently detached from the stamp strip when no envelop, card, or other article is in position to receive the same.

Another object of the invention is to improve the means for registering the operations of the machine.

Other objects, as for instance, the improvement of the stamp sheet advancing mechanism will appear from the following description and claims.

The invention consists in certain features of construction of the parts, their arrangement, and in certain combination of devices whereby the objects of the invention are carried into effect as shall hereinafter be more particularly described in their preferred forms and relations, and pointed out in the claims.

Similar numbers of reference designate corresponding parts throughout.

Figure 4:
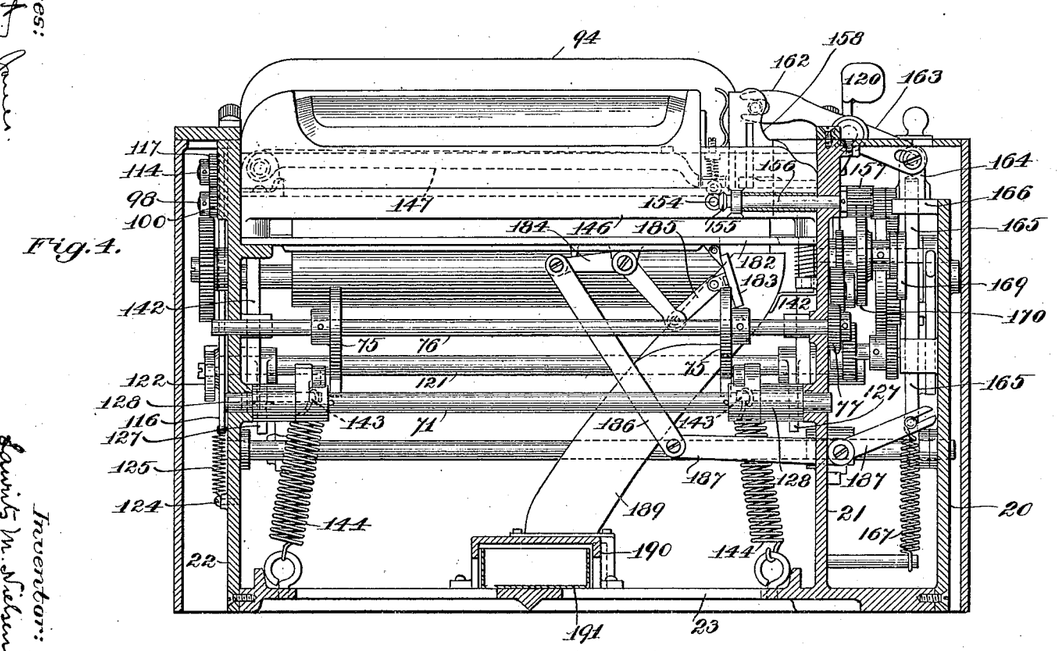
Fig. 4, represents a vertical cross sectional view of the machine, taken on line 4—4 Fig. 3.

As illustrated in the drawings the working parts of the machine are supported by side frames 20, 21, and 22 connected by the bottom 23 Fig. 4, and other parts suitably secured and furnished with a dust excluding casing, to which portions of the mechanism may be attached.

Figure 1:
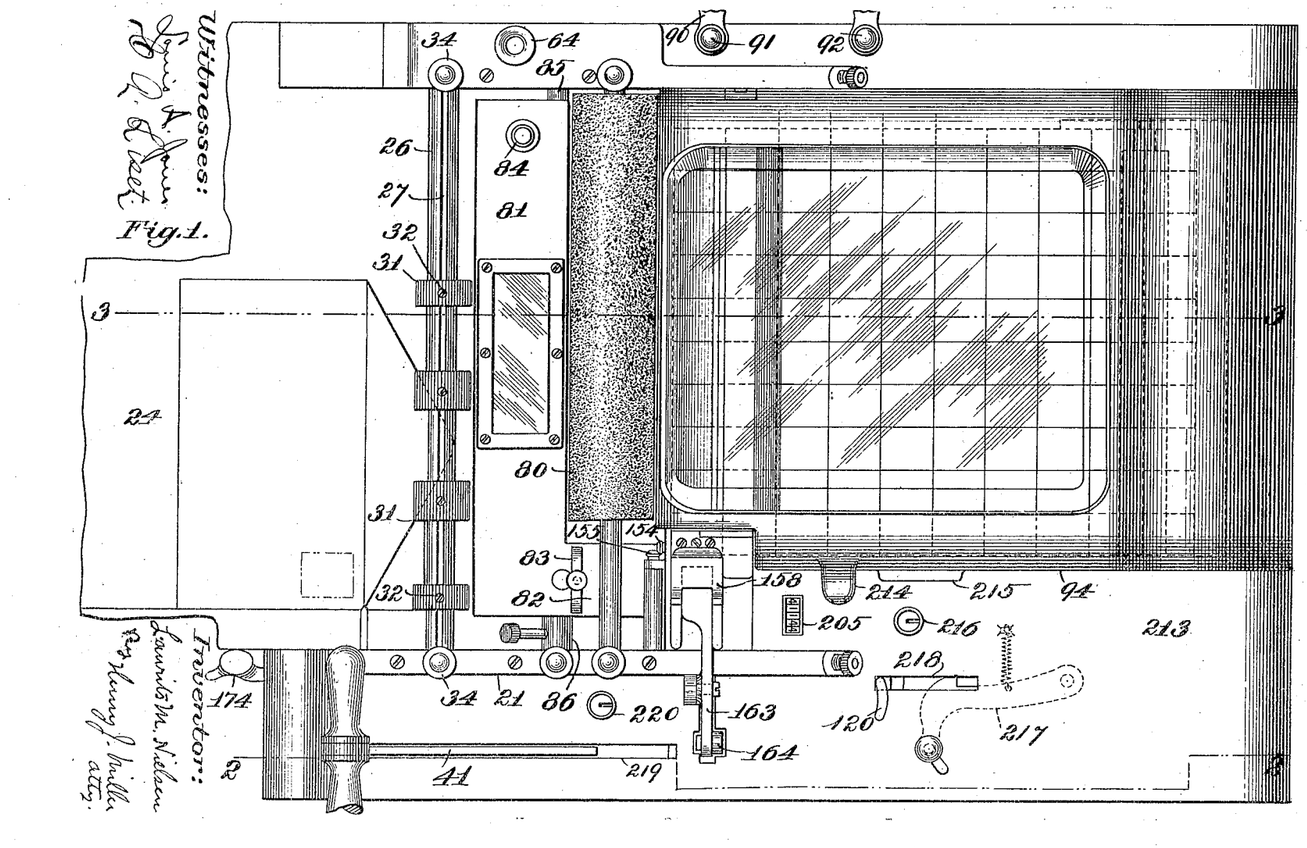
Figure 1, represents a plan view of the improved envelop sealing and stamping machine, an envelop being shown in position to be fed into the machine; the stamp location on the envelop being indicated in broken lines.
Figure 13:
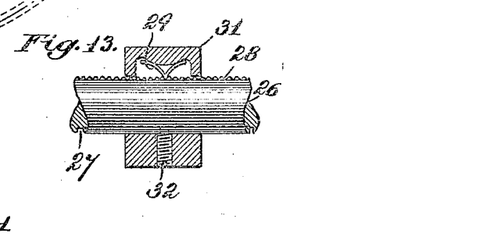
Fig. 13, represents a view illustrating details of construction of the first feed shaft and one of its feed rolls, showing the adjustability of the roll on the shaft.

Projecting from the front of the machine is the table 24 on which the envelops, cards, or other articles to be operated on are placed, and are successively fed to the first feed shafts 25, 26 by hand, the flaps of the envelops being open are first fed to said rolls with their gummed surfaces downward, these shafts having longitudinal grooves 27 as shown in Figs. 1 and 13, and are furnished with teeth 28 with which the springs 29 of the roll sections 30, 31, Fig. 13, engage, the screws 32 of said sections working in the grooves 27, whereby the roll sections 30 and 31 are adjustable along their respective shafts.

Figure 2:
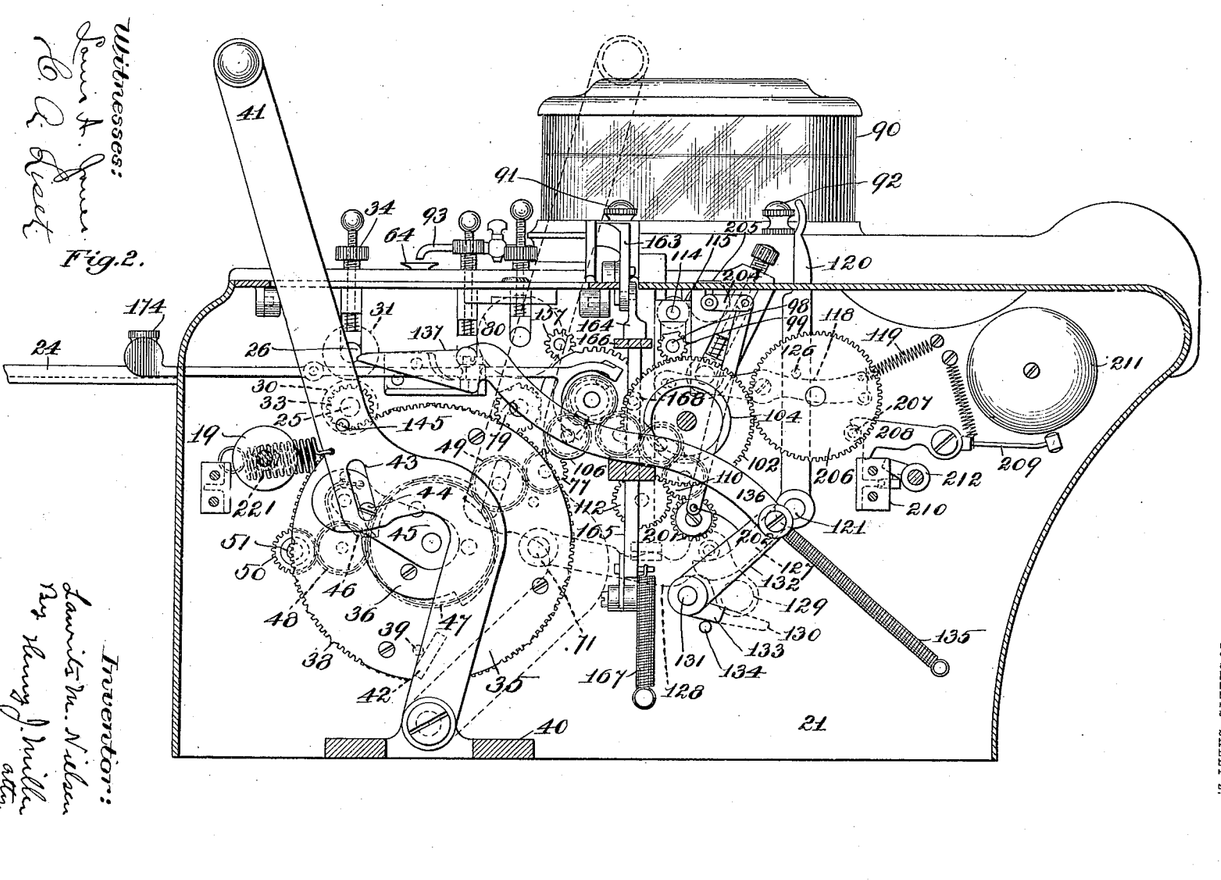
Fig. 2, represents a longitudinal sectional view of the machine taken on line 2—2 Fig. 1.

The shaft 25 is journaled in bearings in the frames 21 and 22 and is furnished at one end with the gear 33, Fig. 2; the shaft 26 being journaled in a pair of spring pressed blocks working in guides in the frames 21 and 22 and provided with the adjusting screws 34—34 which bear on said springs.

Figure 7:
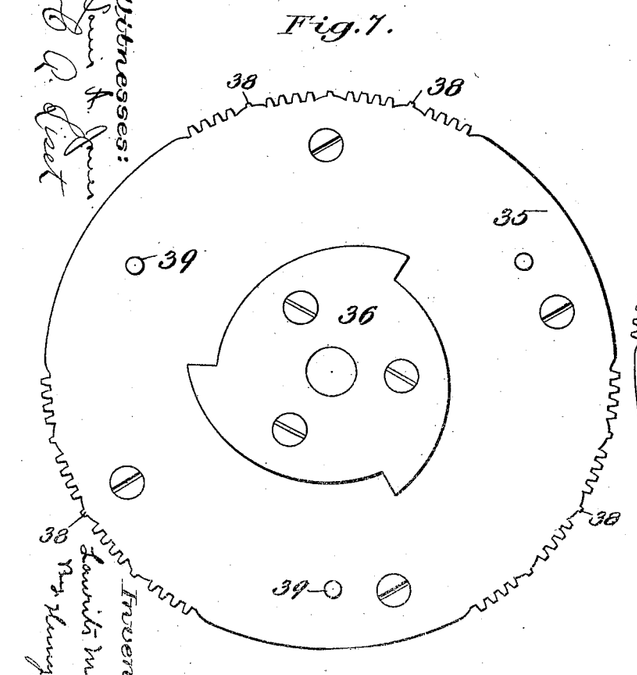
Figs. 7, and 8, represent side elevations of the main drive gears.
Figure 8:
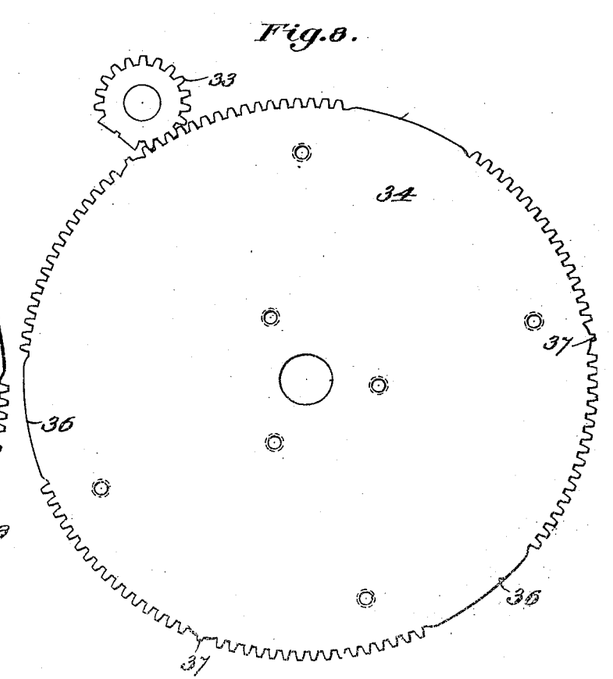

The gear 33 has a flattened portion on its periphery furnished with a recess; this gear being driven from the section 34 of the main gear Figs. 7—8, this main gear being rotatably mounted on the frame 21 and comprising the sections 34 and 35 and the ratchet 36, and midway of each group of teeth is the spaced tooth 37 adapted, at times to engage in the recess in the flattened portion of the gear 33.

The section 35 of the main gear has its teeth divided into three groups separated by plain peripheral portions of equal length to the extent of each group of teeth and each group of teeth being furnished with three spaced teeth 38—38; this section 35 having also the pin 39.

On the bracket 40 is pivoted the main lever 41 which is curved to swing over the shaft of the main gear and has the stop plate 42 adapted to be intercepted by the pin 39 on said gear when the limit of forward movement of the lever 41 has been reached; the lever has also the slot 43 and in this slot works the pin 44 of the arm 45, which arm is pivoted on the shaft of the main gear and carries at its outer end the pivoted pawl 46, spring pressed to keep its free end against the ratchet 36, so that at each backward swing of the lever 41 this pawl 46 is carried back, on its arm 45, until its free end is in position to engage in the next ratchet tooth, and the movement of the lever 41 and the proportion of the ratchet 36 to the main gear being such that this gear is caused to make one third of a rotation at each complete forward movement of the main lever.

Figure 3:
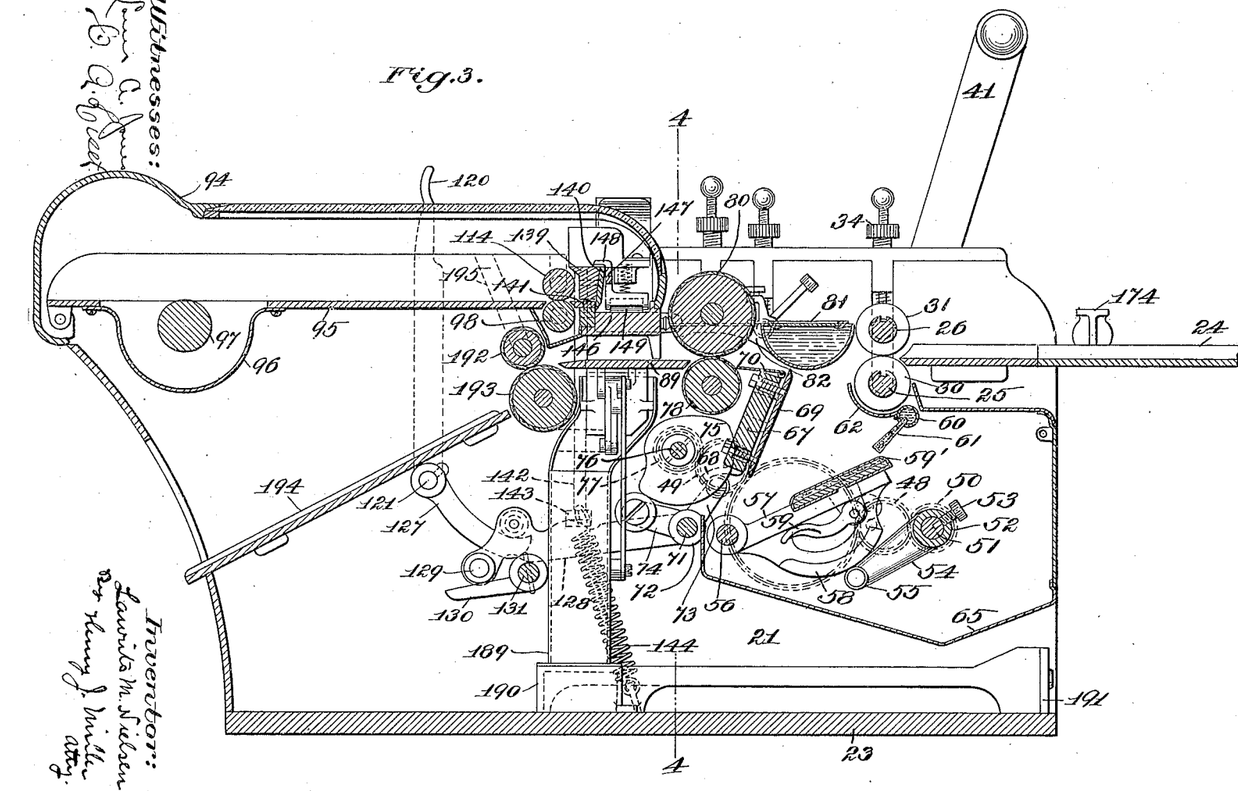
Fig. 3, represents a similar sectional view taken on line 3—3 Fig. 1, and looking towards the right hand side of the machine.

Fixed to the gear section 34 is a gear 47, shown in dotted lines in Figs. 2 and 3, and meshing with this gear are the idle pinions 48 and 49 journaled on studs extending from the frame 21, the pinion 49 engages with the gear 50 on the end of the shaft 51 which is journaled in bearings in the frames 21 and 22 and carries sleeves 52, releasably secured to said shaft by the thumb screw 53 and having the arms as 54 with laterally projecting portions 55, the withdrawal of the screw 53 permitting the rotation of the shaft 51 without swinging the arms 54.

Pivotally mounted in the frames 21 and 22 is the shaft 56 having arms as 57, Fig. 3, furnished with cam plates as 58 against which the portions 55 of the arms 54 on the shaft 51 are designed to work at times to swing said arms 57 upward: On these arms 57 is adjustably secured, by means of the clamp 59, the pad 59' having an upper surface adapted to absorb and retain moisture.

Above the pad 59' is located the transverse water feed pipe 60 having a longitudinal slot in which the felt strip 61 is secured, and an upwardly extending shield 62 to prevent moisture from flying upward; the end of the feed pipe 60 is connected by the pipe 63 with the funnel 64, and the excessive or surplus moisture delivered to the pad 59' is received by the trough or receiver 65 which extends beyond the shaft 56.

Figures 9, 10:
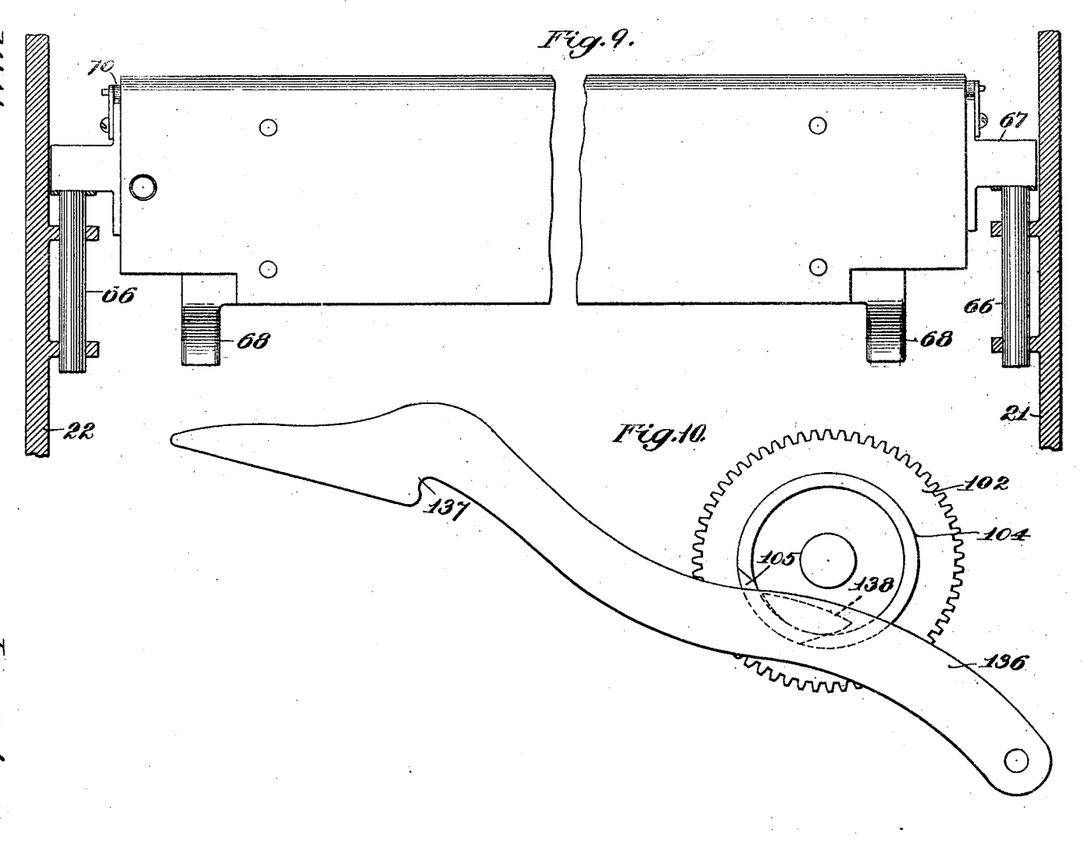
Fig. 9, represents a vertical sectional view of portions of the frame and a front elevation, partially broken away of the envelop intercepting and sealing wall or barrier.
Fig. 10, represents a plan view of the stamp sheet feed and cutter lever in relation to the cup gear whereby the same is held from engagement with the main lever.

In guides extending from the frames 21 and 22, above the shaft 56 are movably mounted the rods 66—66 (Fig. 9) carrying a frame 67 having the dependent arms 68—68 and yieldingly mounted on this frame 67 is the plate 68 having an upper beveled edge, while to the upper portion of the frame 67 is pivoted the guide plate 70, see Figs. 3 and 9 of the drawings.

The shaft 71 is secured in the frames and carries sleeves as 72, Fig. 3, from which extend the arms 73 and 74, the arms 73 bear against the curved arms 68 of the frame 67 and serve to support the same; against the anti friction sleeves of the arms 74 bear cams, as 75 Fig. 3, which are shaped to press downward on these ends of said arms 74 during approximately a one half rotation of the shaft 76, and to permit the rise of the arms 74 and the resultant downward movement of the arms 73, and of the frame 67 at times, the shaft 76 being caused to rotate by its gear 77 meshing with the pinion 49.

Journaled in bearings in the frames 21 and 22 is the shaft of the second feed roll 78; this roll is driven intermittently by the engagement of its peculiar gear 79, Fig. 2, with the intermittently arranged teeth of the main gear section 35; the main length of the roll 78 is covered with some fibrous material and on this material rests the free edge of the guide plate 70. Above the roll 78 is its companion roll 80 similarly covered with fibrous material and having its shaft preferably journaled in yielding bearings in the frames 21 and 22.

Figure 5:
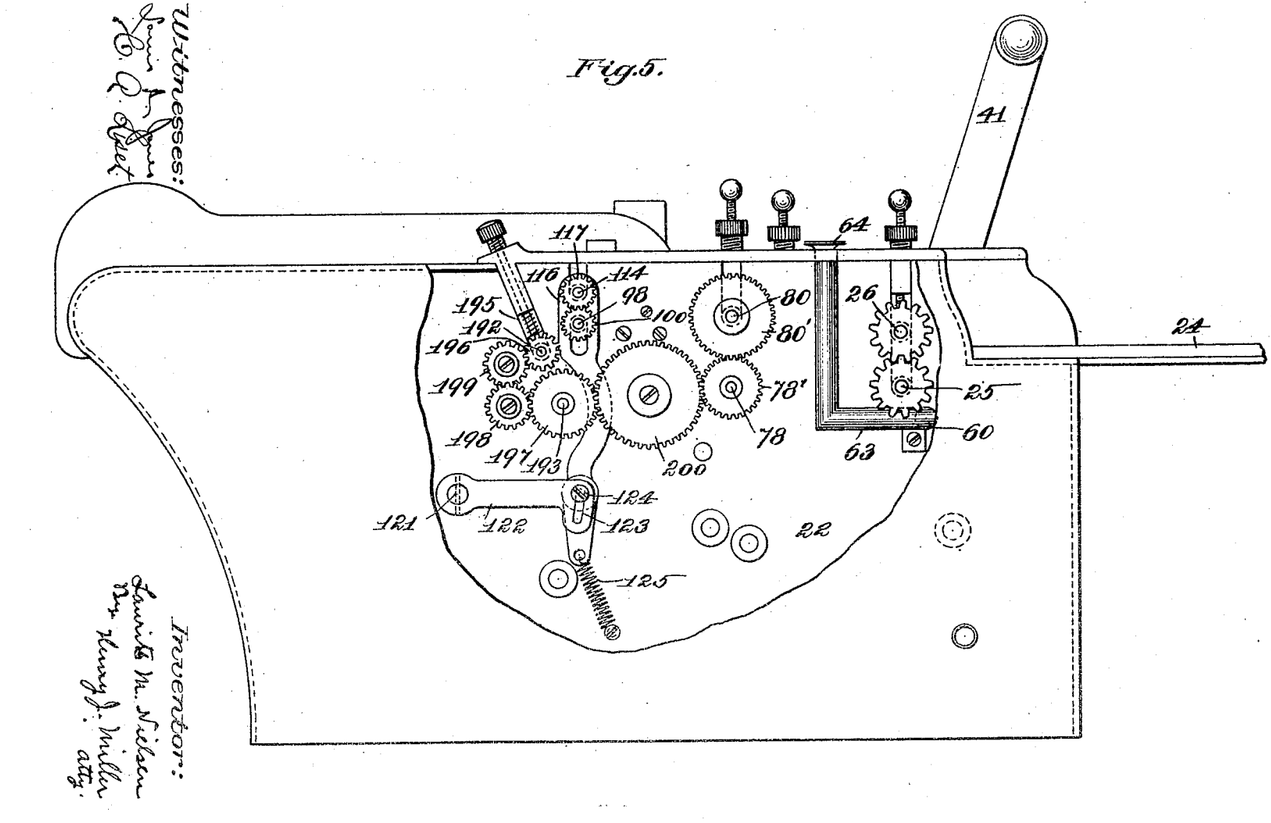
Fig. 5, represents a side view of the machine looking towards the right, part of the frame being broken away to show the water supply conduit, for the sealing moistener, and the various driving connections at this side of the machine.

Motion is imparted from the shaft of the roll 78 to that of the roll 80 by the gears 78' and 80' mounted on the ends of said shafts which are journaled in the frame 22, as will be seen by reference to Fig. 5 of the drawings.

Figure 11:
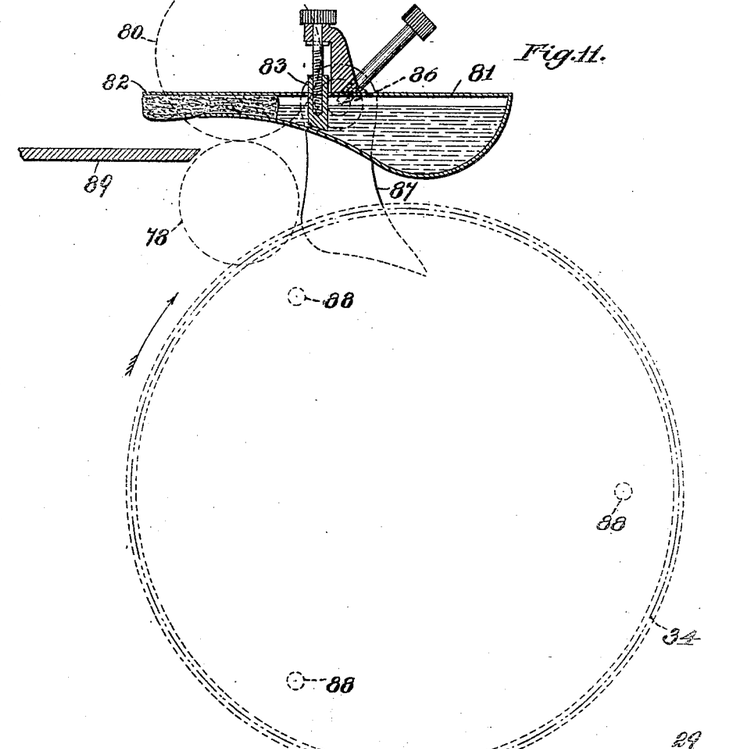
Fig. 11, represents an enlarged sectional view of the moistening device for moistening the stamp position on the face of the envelop, this moistener being shown in relation to some of the coöperating parts.
Figure 12:
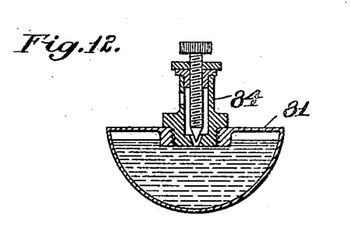
Fig. 12, represents a cross sectional view of the moistener tank shown in Fig. 11, taken on a line through the inlet.

The tank 81 has a convex bottom and a spout 82 extending from one end thereof and furnished with a fibrous pad, through which moisture controlled by the gate 83 Fig. 11, may escape; this tank being further furnished with a valved supply and air inlet 84, Figs. 1 and 12, positioned on the same radius, from a common center, with the funnel 64; at the ends of the tank 81 are pivots 85 and 86 which are pivotally mounted in yielding bearings in the frames 21 and 22, the pivot 86 extending beyond the frame 21 and having fixed to it the cam plate 87 which is positioned to receive the pins 88 on the main gear section 34, as is indicated in Fig. 11 of the drawings, so that at each forward throw of the lever 41 the tank 81 is tipped by the working of the pins 88 under the cam plate 87 to carry the moistener pad of the spout 82 down on to the table 89, mounted in the machine beyond the rolls 78 and 80, or on to an envelop or card passing over said plate to moisten the portion thereof to which it is intended to apply a stamp.

When the envelop reaches the table 89 it is in position for the affixing of the stamp; in its progress to this position the envelop, its flap being opened, with the gummed surface downward is carried by the rolls 30 and 31 to the plate 69, as the end of the envelop flap is intercepted by this plate the flap is directed downward during the further movement of the envelop, until the forward edge of the envelop rests against said plate 69, at this time the rotation of the gear 47 operates, through the gears 48 and 50 to rotate the shaft 51, and the sleeve 52, if such sleeve be not disconnected, to swing the arms 54 upward, the ends 55 of these arms 54 working against cams 58 of the moistener pad 59' and swinging this pad upward until the envelop flap is pressed by said pad against the plate 69 thus effectually moistening the gummed surface of the flap. In its upward movement the pad 59' may gather additional moisture by wiping across the edge of the supply pad 61.

At the completion of the flap moistening, the flap moistener falls backward and at this time the cams 75 have been rotated to a position where the arms 74 are permitted to suddenly rise, thus allowing the arms 73 and the frame 67 sustained thereby to move downward until the upper beveled edge of the plate 69 is slightly below the path of the envelop, feeding rotation of the rolls 30 and 31 now carries the envelop between the convex bottom of the tank 81 and the beveled edge of the plate 69 and, by its movement over said edge, the flap is closed against the body of the envelop while the forward edge of the envelop is guided, by the plate 70 to and between the rolls 78 80 which compress the flap against the body of the envelop to effectually seal the same, and then deliver the envelop on to the table 89; at this time the tank 81 being tipped as heretofore described to moisten the stamp location on the face of the envelop in the upper right hand corner.

Attention is called to the fact that the tank 81 is not tipped until the envelop has reached a position where the moistener in the spout of the tank will apply moisture only to the position, or area, to which the stamp is to be applied.

Before proceeding with the description of the stamping and related mechanism, attention is called to the main water tank 90 which is mounted on screws 91 and 92 secured to the frame, or to some portion of the casing, the screw 92 represents the center from which the inlets 64 and 84 to the water supplies are equally distant, so that, by the loosening of the screw 91 this tank may be swung on the screw 92 to bring the end of its spout 93 in position to deliver water to either of said inlets.

The stamping mechanism comprises a casing having a hinged cover 94 adapted to be locked, the casing having a stamp table 95 on which a sheet of stamps may be positioned for accurate feeding forward and a compartment 96 in which is journaled the roll 97 adapted to receive a series of sheets of stamps secured together end to end to form a strip.

Figures 14, 15, 16, 17, 18:
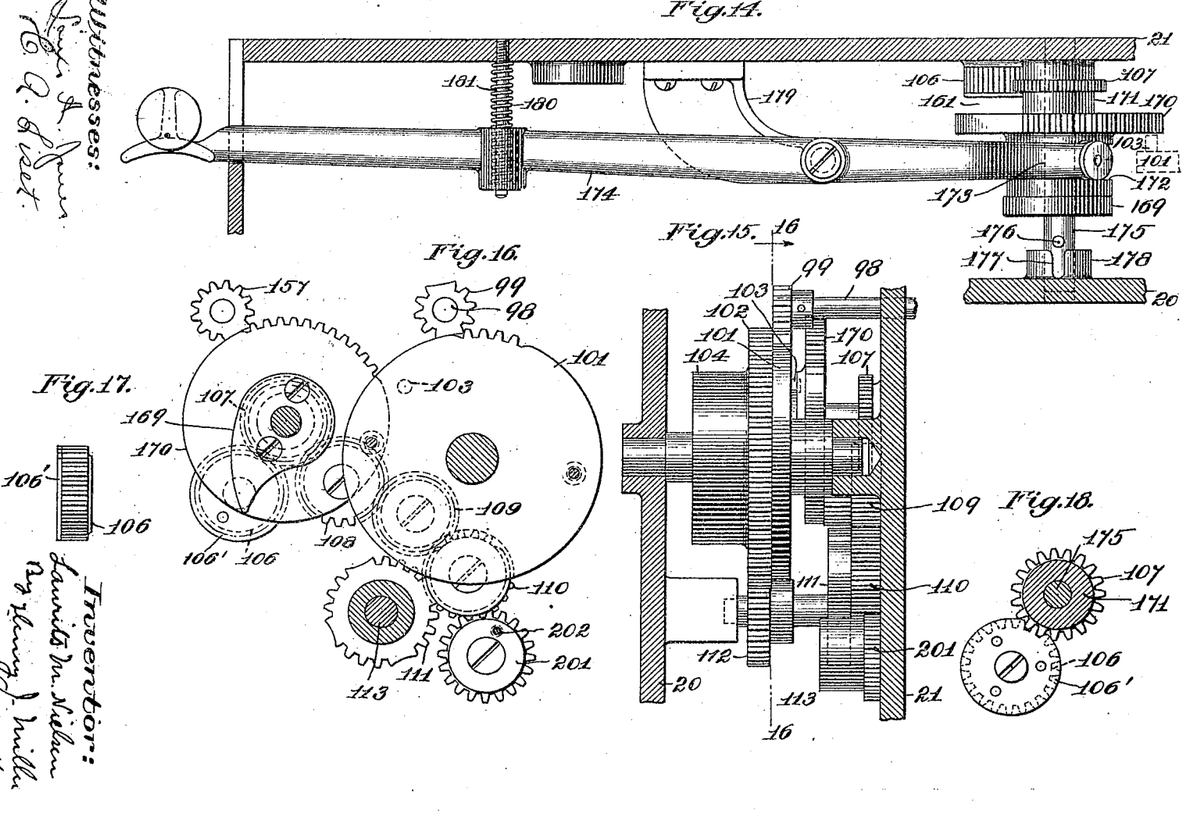
Fig. 14, represents a longitudinal sectional view of portions of the machine frame to show a plan view of the lever and its associated mechanism for controlling the stamp strip feed and the stamp affixing mechanism.
Fig. 15 represents a vertical sectional view of portions of the frame and showing the cup gear and its related train of gears.
Fig. 16, represents a vertical sectional view taken on line 16—16, Fig. 15, looking in the direction indicated by the arrow.
Fig. 17, represents an edge view of the gear for transmitting motion to the stamp strip feed.
Fig. 18, illustrates this gear in relation to its shift gear.

At the inner end of the table 95 is journaled, in the frames 21 and 22, the sheet feed roll 98 having gears 99 and 100 at its respective ends, the gear 99 meshing with the teeth of the section 101 of the cup gear 102, see Figs 15 and 16, so that at each rotation of the cup gear this gear 99 and its feed roll is caused to rotate sufficiently to effect the advancement of the sheet of stamps a distance equal to the length of one stamp; the cup gear section 101 is furnished with the inwardly extending pin 103, and the cup section 102 has the annular flange, or cup 104 furnished with the beveled edge opening 105, see Fig. 10.

Motion is imparted to the cup gear 102 through a train of gears 106 (meshing with the gear 77) 107, 108, 109, 110, 111, and 112, the gears 111 and 112 being on the same shaft 113, gear 111 meshing with the gear 110 and that marked 112 meshing with the cup gear 102; included in this train of gears is the stamp strip disconnector which will hereinafter be more fully described.

The upper sheet feed roll 114 is journaled in vertically movable frames 115 and 116, Figs. 2 and 5, and has a gear meshing with the gear 100 of the roll 98, both of the rolls 98 and 114 having roughened or milled surfaces, to readily engage a sheet of stamps.

The frames 115 and 116 are mounted to move vertically in slots in the frames 21 and 22; to the frame 115 is pivoted the bar 118 which is pivotally mounted on the frame 21, see Fig. 2 this projection being depressible by means of the lever 120 fixed on the shaft 121 which is journaled in bearings in the frames 21 and 22 and has at its further end, see Fig. 5, the arm 122 furnished with the curved slot 123 working over the pin 124 of the frame 116, a retarding strain being exerted on this latter frame 116 by the spring 125 connected to said frame and to the main frame 22. Owing to the upper curved edge of the bar 118 and the curved slot 123 in the arm 122, a certain degree of rotation of the shaft 121 is effected by the swinging of said lever before the pin 126 of this lever causes the depression of the extension of said bar 118 against the action of the spring 119 and before the end of the curved slot 123 lifts the pin 124 and its frame 116.

On the shaft 121, between the frames 21 and 22 are fixed the curved fingers 127—127, Figs. 3 and 4, and on the shaft 71 are pivoted the arms 128—128 which have projecting bearings working on said fingers; these arms 128—128 having depending ends furnished with projecting bearings as 129 which rests on the lifter fingers 130 of the shaft 131 which is rotatable in bearings of the frames 21 and 22 and has, at the end projecting through the frame 21, Fig. 2, the arm 132 furnished with the projection 133 which is adapted to be intercepted by the pin 134 on the frame 21 when the arm 132 is drawn back by the spring 135 connected with said arm and with the frame 21.

To the arm 132 is pivoted the curved lever 136, shown in Figs. 2 and 10, having the hook end 137 and the cam shaped projection 138 which is adapted to enter the flange, or cup, 104 of the gear 102 at times through the opening 105 to sustain this lever 136 until the opening 105 is again brought opposite the projection 138, when this projection drops through said opening and permits the depression of the lever 136 as will hereafter be described.

Figure 6:
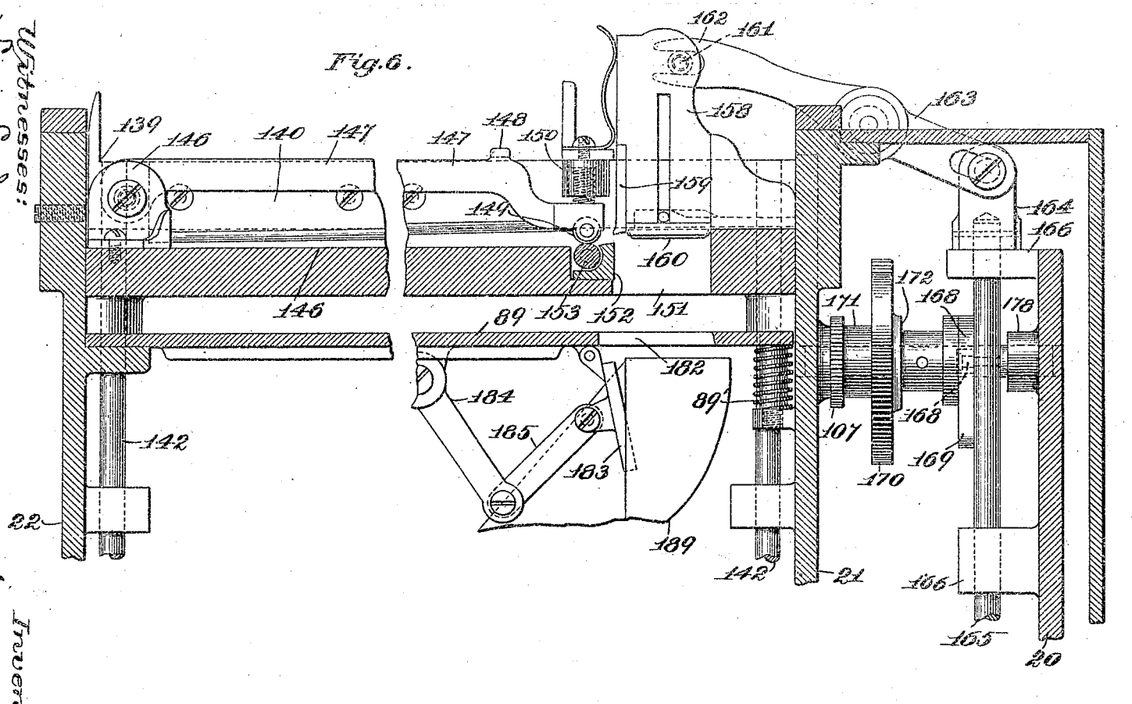
Fig. 6, represents an enlarged sectional view of parts of the machine to illustrate the stamp strip feed and the stamp detaching and affixing device together with the stamp chute and trap for receiving a stamp inadvertently detached from a strip when no envelop or other article is in position to receive said stamp.

Working in vertical guides of the frames 21 and 22, see Figs. 3 and 6, is the cutter bar 139 provided with the cutter 140 which works over the inner edge of that narrow plate 141 which forms a support for the stamp sheet beyond the roll 98; the guide rods 142—142 of the cutter bar have lateral projections 143, Figs. 3 and 4, which bear on the arms 128—128 and are connected to stationary parts of the frame by the springs 144—144.

The cup gear 102 completes a single rotation at the tenth stroke of the lever 41, and the opening 105 is then brought opposite the projection 138 of lever 136, permitting this projection to drop through the opening to allow the depression of the lever 136 to swing downward to a point where, on the next stroke of the lever 41, the pin 145 on said lever 41 may engage in the hook end 127 and draw forward the lever 136 and with it the arm 132, to rotate the shaft 131 and lift the arms 128 by means of the fingers 130, thus lifting the cutter bar and its cutter, at this time the sheet feed rolls 98 and 114 are given sufficient rotation to advance the sheet of stamps the distance equal to one stamp and, when the fingers 130 swing by the bearings 129, the springs 144 are permitted to act to suddenly draw down the cutter bar and its cutter 140 to sever the advanced row of stamps from the main sheet.

When the lever 41 approaches its forward limit of movement the beveled end of the hook 137 of the lever 136 rides up the bearing 19 on the frames 20 and 21, and the hook 137 is lifted out of its engagement with the pin 145; the spring 135 is now permitted to draw backward the arm 132 and the lever 136, and, in the mean time the cup gear has been partially rotated, from the position last described, so that as the lever 136 is drawn backward, its projection 138 enters the opening 105 of the cup and is sustained by the cup flange, to hold the lever 136 out of engagement with the pin 145 of the lever 41 until another series of ten movements of said lever has been made. This number of movements of the lever 41 however depending upon the number of stamps in each row, as where in England, each row contains twelve stamps.

Fixed, in the machine parallel to and slightly below the plate 141 is the stamp strip support 146, see Figs. 3 and 6, adapted to receive the strip of stamps as it is severed from the main sheet; at one end of this strip support 146 is secured a bracket on which is pivoted the arm 147, which extends alongside the cutter 140 and has the bent lip 148 which extends over the top of the cutter bar, at the free end of this arm is journaled the idle roll 149; and this end of the arm is yieldingly pressed by a spring carried by the projection 150 from the cutter bar.

Adjacent to the position of the roll 149; the support 146 has the opening 151 approximately the size and shape of a postage stamp, one edge of this opening being formed by the cutter jaw 152 shaped to fit about the stamp strip feed roll 153 which is journaled in the material of the support 146 and is furnished at its outer end with the bevel gear 154, Figs. 1 and 4, and meshing with this gear is the bevel gear 155 of the shaft 156 which is journaled in bearings, carried by the support 146 and in the frame 21, the outer end of this shaft being furnished with the gear 157, Figs. 4 and 16.

Working through the opening 151 of the stamp strip support and against a spring on the projection 150 is the stamp affixing plunger 158 having the cutter jaw 159, which co-operates with the jaw 152 to sever a stamp from the strip fed thereto, and the stamp pressing block 160, the upper end of this plunger having the rod 161 in which the jaw 162 of the lever 163 engages, this lever 163 being pivotally mounted on the frame 21 and pivotally connected to the cap 164 mounted on the rod 165 which cap limits the downward movement of said rod in its guides 166—166 under the action of the spring 167 secured to said rod and to a fixed portion of the machine; the rod 165 is furnished with the projecting bearings 168 with which the cam 169 on the sleeve of the gear 170 is designed to engage at each rotation of this gear, to lift the rod 165 and to depress the plunger whereby a single stamp is cut from the stamp strip by the jaws 152 and 159 and is carried downward a considerable distance by the head 160 and pressed against the moistened stamp position of the envelop if such envelop be in place on the table 89.

As has been stated above, the stamp feeding mechanism, and the parts related thereto, is driven from the gear 77 by means of the train of gears 106 to 112, motion being transmitted by the gear 106 to that marked 107 and thence by means of the gear 170, fixed on the sleeve which carries the gear 107, to the stamp strip feed 157, while the gear 112, fixed on the shaft of the gear 111, is engaged with the teeth of the cup gear 102 thereby driving the cup gear section 101 and the stamp sheet feed gear 99.

As it is often desirable to operate the sealing mechanism without operating the stamp affixing devices, a throw off or disconnecting mechanism is arranged to form part of the power transmission gearing; to prevent the operation of the throw off during the operation of the stamp affixing devices the gear 106 is furnished with a guard plate 106' which extends to the peripheral line of the teeth of said gear but is cut away between the three teeth which are in engagement with the gear 107 at the time when the mechanism is at rest.

The gear 107 with the gear 170 and the cam 169 are fixed to the sleeve 171, see Fig. 14, which has a groove 172 to receive the inwardly extending bearings of the yoke 173 formed in part with the shipper lever 174; the sleeve 171 being in turn fixed to the shaft 175, mounted to rotate and reciprocate in bearings in the frames 20 and 21, having the pin 176 which is adapted to engage, at times, in the slot 177 of the collar 178 which embraces the bearing in the frame 20. The shipper lever 174 is pivotally mounted on the bracket 179 secured to the frame 21 and being normally pressed in a direction to keep the gear 107 in mesh with the gear 106 by the spring 180 carried by the pin 181 extending from the frame 21 and the lever being furnished with a perforation working over said pin.

By pressing inward the free end of the lever 174, the shaft 175 is moved outward to disengage the gear 107 from the gear 106 thus interrupting the driving connection through the train of gears; this, however, can only be accomplished when the gear 106 has reached the predetermined position and then only when the pin 103 of the gear 101 is out of the position shown in Fig. 14, this pin 103 being provided on that portion of the gear 101 which is brought opposite the gear 170 as the ninth stamp from the stamp strip is being affixed, or on every tenth action of the stamp affixer: it being found preferable in practice that the stamping mechanism should not be disconnected at this time.

In order to accommodate the various thickness of envelops and their contents, the table 89 is yieldingly mounted on the spring 89' which is supported by a projection from the frame 21 and embraces a stud depending from said table.

That the loss of stamps may be prevented by the operation of the machine where no envelop is passing therethrough, the table 89 is furnished with the opening 182, immediately below the plunger 158, of a size to readily permit the passage of a stamp, this opening is closed at times by the trap 183 hinged to the under side of the table and pivotally connected to the bell crank 184 by the link 185, the bell crank being pivotally supported from the under side of the table 89 and operatively connected by the levers 186 and 187 with the rod 165 so that the trap 183 is swung upward to close the opening 182 during the downward movement of the plunger and is swung downward at the upward movement of the said plunger to permit the dropping through the opening 182 of a stamp deposited on the trap 183 by the head 160 of the plunger. Beneath the opening 182 in the table 89 is mounted the stamp chute 189 leading to the casing 190 secured in the lower part of the machine and furnished with the drawer 191 adapted to be locked against the unauthorized removal of its contents.

During the affixing of the stamp to the envelop a portion of the envelop rests between the rolls 78 and 80 and these rolls come to a stop, owing to the intermittent nature of their driving while the stamp is being fed to and pressed against the envelop the rolls 78 and 80 are then set in motion to continue the progress of the envelop until its forward edge is engaged between the rolls 192 and 193 which feed the stamped envelop to the delivery plate 194. The shaft of the roll 192 is journaled in blocks which work in inclined slots 195—195 of the frames 21 and 22 and are pressed downward by springs suitably mounted, the end of said shaft being furnished with the gear 196, Fig. 5.

The shaft of the roll 193 is furnished with the gear 197 from which motion is transmitted to the gear 196 by the idle pinions 198 and 199 rotated on studs secured to the frame 22; power being transmitted to the gear 197 from the gear 78' by means of the gear 200.

Journaled on a stud extending from the frame 21 is the gear 201 which meshes with the gear 110 and is furnished with the pin 202, Figs. 2, 15, on which the link 203 is pivoted, the upper end of the link being pivoted to the arm 204 of any usual and well known registering device 205 secured in the casing the gear 201 being designed to make a complete rotation for each downward movement of the plunger 158, whereby the number of reciprocations of the plunger, and thus the number of stamps used, may be registered.

Meshing with the gear 102 is the alarm gear 206 Fig. 2, which is journaled on a stud extending from the frame 20 and has the pin 207; pivoted on a stud extending from the frame 21 is the arm 208 having the spring retracted hammer 209, the free end of the arm 208 being adapted to intercept the pin 207 to be lifted thereby against the action of the hammer spring until released by said pin and then to fly back under the retraction of the spring until it, the arm 208, reaches the stop 210, the hammer at the same time striking the gong 211 to signal the fact of the completion of the rotation of the gear 206, or of the cutting of another row of stamps from the sheet, if such be present in the machine. A stop 212 is rotatably mounted on the frame 21 in position to be turned up against the arm 208, to lift the same and to prevent the action of the hammer.

The casing which incloses the frame and the operative mechanism may be of any ornamental design and is adapted to exclude dust therefrom; the casing top 213, has the hinged cover 94 for covering the stamp compartment furnished with the thumb lip 214 and the plate 215 adapted by reason of any usual construction to be engaged by the bolt of the lock 216. On the underside of the top 213 is pivoted the spring latch 217 working across the slot 218 and adapted to engage and hold the lifter arm 120 whereby the cutter bar 147 may be held in the elevated position when desired. In the forward portion of the top 213 is the slot 219, through which the lever 41 works, and adjacent to this slot is the lock 220 the bolt of which is adapted to be projected across this slot 219 to engage the lever 41 and lock the same against movement.

The lever 41 may be furnished with the retracting spring 221 secured to said lever and to some fixed portion of the machine but this spring is not essential to the working of the lever and may be omitted.

Having thus described my invention, I claim as new and desire to secure by Letters-Patent.

1. Envelop sealing means comprising a shaft, arms mounted to swing on the shaft and having cams, a moistening pad also mounted on the arms, a second shaft connected with the main driving mechanism, and arms mounted on said second shaft, and adapted to be disconnected therefrom, for working against the cams of the pad arms to move the same.

2. Envelop sealing means, comprising a feed roll, a fluid supply pipe extending beneath the roll and having a guard partially embracing the roll and a laterally extending fibrous feed strip and a moisture conveyer movably mounted beneath the feed strip.

3. Envelop sealing means comprising means for feeding an envelop with its flap open, an inclined deflector, movably mounted in the path of the envelop, and having an upper beveled edge, means for moving the deflector and means for pressing the envelop flap against the deflector and at the same time moistening the gummed surface of the flap.

4. Envelop sealing means comprising primary envelop feeding devices adapted to feed the envelop with its flap open secondary feeding devices adapted to feed and compress the envelop after the flap is closed, and movable means normally located in the path of the envelop between such feeding devices and adapted to be moved out of such path at times to permit the further feeding of the envelop and adapted to close the flap of the envelop, together with means for moistening the flap.

5. Envelop sealing mechanism comprising primary and secondary envelop feeding devices, a deflector movably mounted in the path of the envelop for intercepting the flap of the envelop, means for moving the deflector out of the path of the envelop, and means located above the path of the envelop to limit its upward movement of said envelop passes over the deflector.

6. Envelop sealing mechanism comprising means for feeding an envelop with its flap open, curved means above the path of the envelop for directing its course, a deflector normally approximately in contact with such curved means and movably mounted with respect thereto, and means for moving the deflector to permit the passage of the envelop between the same and said curved means.

7. Envelop sealing means comprising a secondary feed roll, a frame movably mounted adjacent thereto, a deflector plate mounted on said frame, a guide plate pivotally mounted on said frame and bearing on the feed roll, and means above said frame for limiting the upward movement of the envelop.

8. Envelop sealing mechanism comprising primary and secondary feeding devices, a stamp position moistener pivotally mounted between said devices, means for swinging said moistener after the envelop has been received by the secondary feed, and a deflector movably mounted below a portion of said moistener, and means for moving said deflector away from such position to permit the passage of the envelop without moving said moistener.

9. Envelop sealing and stamp position moistening means comprising a fixed supply pipe for the flap moistener having an inlet, and a pivotally mounted stamp position moistener having a fluid supply opening, the openings of both moisteners being disposed on the same radius from a center common to both, and a pivotally mounted tank having a spout adapted to be swung over each of said openings in turn.

10. Envelop sealing means comprising a frame movably mounted and furnished with a flap deflector plate and with depending curved arms, lever arms pivotally mounted and adapted to bear on said curved arms, cams rotatably mounted and working against extensions of said levers for approximately a one half rotation of the cams and to permit the movement of said extensions to allow the dropping of said frame at times.

11. The combination with a stamp affixing mechanism furnished with a table for receiving envelops to which stamps are to be affixed, of intermittently operated mechanism for feeding the envelops to such table, a deflector movably mounted in the path of the envelop, means for moving said deflector, means movably mounted above the deflector for guiding the envelop and carrying a stamp position moistener, and mechanism for moving said guiding means after the movement of the deflector.

12. The combination with a stamp applying mechanism, of a table for receiving the envelops to which stamps are to be applied said table having an opening located in the path of the envelop and adapted to be covered by the stamp receiving portion of an envelop when such envelop is present on the table.

13. The combination with a stamp applying mechanism, of a table towards which such applying mechanism works, said table having means adapted to be covered by the stamp receiving portion of an envelop for receiving a stamp when no envelop is present on said table.

14. The combination with a stamp applying mechanism of an envelop supporting table towards which said applying mechanism works, said table having an opening adapted to be covered by the stamp receiving portion of an envelop to receive the stamp when no envelop is present, and means for closing the opening.

15. The combination with a stamp applying mechanism, of a table towards which said applying mechanism works, said table having an opening located beneath said stamp applying mechanism to receive the stamp when no envelop is present, means movably mounted for closing said opening, and connections between the closing means and the driving mechanism for closing said means at times.

16. The combination with a stamp applying plunger, and means for operating the same, of a table having a stamp receiving opening towards which said plunger works, a movably mounted closure for said opening, and connections between said closure and the plunger operating means for closing the closure on the forward movement of the plunger.

17. The combination with a stamp applying mechanism, of a table towards which said mechanism works, said table having an opening to receive the stamp, and a chute adapted to receive a stamp passing through the opening.

18. The combination with a stamp applying mechanism, of a table having an opening towards which said mechanism works, a stamp receptacle, and means for conveying stamps from said opening to said receptacle.

19. The combination with a stamp applying mechanism, of a table having an opening towards which said mechanism works, a closure for said opening, means for operating the closure, and means for receiving stamps as they pass through said opening.

20. The combination with stamp strip feeding means, stamp severing means, and stamp applying means, of a table fixed as regards the stamp applying means and having an opening, a chute below said opening, a closure adapted to fit said opening to provide a continuous upper surface for the table, and means for moving the closure out of said opening at times.

21. The combination with stamp sheet feeding means, stamp strip severing means, and a stamp strip support having a stamp opening, of a lever pivotally mounted above the stamp strip support and extending approximately to said opening, and a presser roll rotatably mounted in the free end of said lever.

22. The combination with stamp strip feeding means, stamp strip severing means including a vertically movable member, and a stamp strip support, of a lever pivotally mounted on the stamp strip support, and carrying a presser roll, said lever being furnished with means adapted to be engaged by the movable member of the stamp strip severing means to lift said lever.

23. The combination with stamp sheet feeding means, stamp strip severing means including a vertically movable member, means for moving said member, and a stamp strip support, of a lever pivotally mounted and provided with a stamp strip presser roll, said lever having a lip, or member extending over the movable severing member.

24. The combination with stamp sheet feeding means, stamp strip severing means including a vertically movable member, driving means therefor, of a lever, connections between the lever and said movable member for moving said member independently of the driving mechanism, and means for locking said lever to support the movable member in an inoperative position.

25. In a stamp affixing machine, the combination with the driving mechanism, and an idle gear included in such mechanism and furnished with a guard covering the spaces between certain of its teeth, of a stamp strip feed a gear for driving the same, a shaft, a sleeve movable on said shaft and having a gear meshing with the gear of the stamp feed and a second gear meshing with the idle gear and means for moving the sleeve on its shaft.

26. In a stamp affixing machine the combination with lever operated stamp sheet cutting means, rotatable means for controlling said lever mechanism, said rotatable means being furnished with a stop, drive gear including a disconnecting gear mounted to move towards the rotatable means and adapted to be intercepted by said stop at times, and means for moving the disconnecting gear.

27. The combination with envelop sealing, stamp affixing mechanism, and driving mechanism therefor, of disconnecting means included in said driving mechanism, said disconnecting mechanism, being operative only when the driving mechanism is at rest.

28. In a stamp affixing machine, the combination with sheet feeding and strip cutting means, driving means therefor including a gear adapted to complete a rotation during the intervals between the operations of the strip cutting means, a second gear meshing with the first mentioned gear, and an alarm furnished with operating mechanism adapted to be actuated by said second gear.

29. The combination with a frame, three pairs of rolls journaled thereon, means for intermittently driving the rolls a curved guide having a moistener pivotally mounted between the first and second pairs of rolls, an inclined deflector movably mounted below said guide, means for moving the deflector, means for moving the guide subsequent to the movement of the deflector, a table located between the second and third pairs of rolls and adapted to receive envelops, and stamp applying means working above said table.

30. The combination with a triple series of envelop feed rolls, of a stamp position moistener pivotally mounted, means for swinging said moistener after a portion of an envelop has moved past said moistener, flap deflecting means movably mounted in the path of the envelop, and means for moving said deflector out of such path.

In testimony whereof I affix my signature in presence of two witnesses.

LAURITS M. NIELSEN.

Witnesses:
C. A. LISET,
H. J. MILLER.